United States Patent [19]

Hass

[11] 4,070,553

[45] Jan. 24, 1978

[54] PERSONAL AUDIO LISTENING SYSTEM

[76] Inventor: William J. Hass, 4105 N. Lawndale, Chicago, Ill. 60618

[21] Appl. No.: 767,476

[22] Filed: Feb. 10, 1977

[51] Int. Cl.$^2$ .............................................. H04M 1/05
[52] U.S. Cl. .................................................... 179/157
[58] Field of Search ................. 179/157; 325/118, 361

[56] References Cited

U.S. PATENT DOCUMENTS

| | | | |
|---|---|---|---|
| 2,285,083 | 6/1942 | Cover | 325/16 |
| 2,541,042 | 2/1951 | Curtis | 179/157 X |
| 3,114,105 | 12/1963 | Neumiller | 179/157 X |

FOREIGN PATENT DOCUMENTS 228,675  2/1925  United Kingdom ................. 179/157

*Primary Examiner*—William C. Cooper
*Attorney, Agent, or Firm*—Howard W. Clement; Manuel Quiogue

[57] ABSTRACT

A personal audio listening system to be worn by an individual listener is disclosed and includes a pair of speakers mounted within a flexible supporting body which surrounds the back and side portions of the listener's neck. The supporting body may include portions which extend generally forward from both sides of the listener's neck and may be joined by a safety releasable fastener to form a closed loop around the listener's neck. The supporting body includes acoustical and safety padding, speaker grills for protecting the speaker cones and the necessary electrical connections for coupling to an audio signal source. The audio signal source may be external to the supporting body or may be enclosed within the supporting body.

12 Claims, 7 Drawing Figures

U.S. Patent  Jan. 24, 1978  Sheet 1 of 2  4,070,553
FIG.1
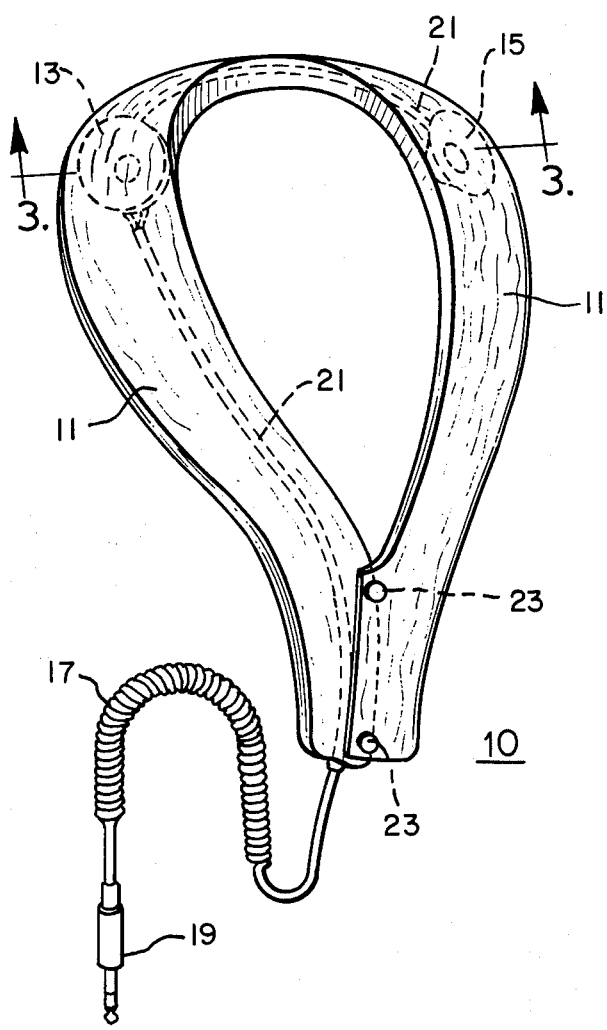
FIG.2
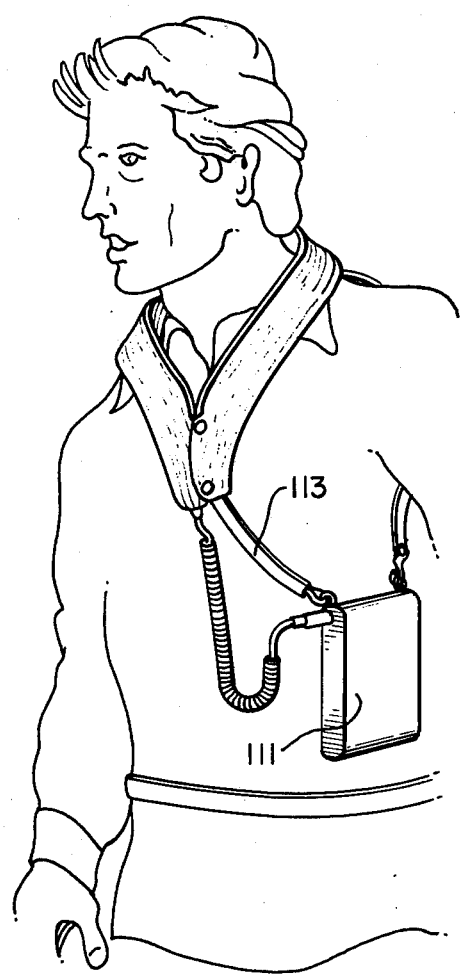
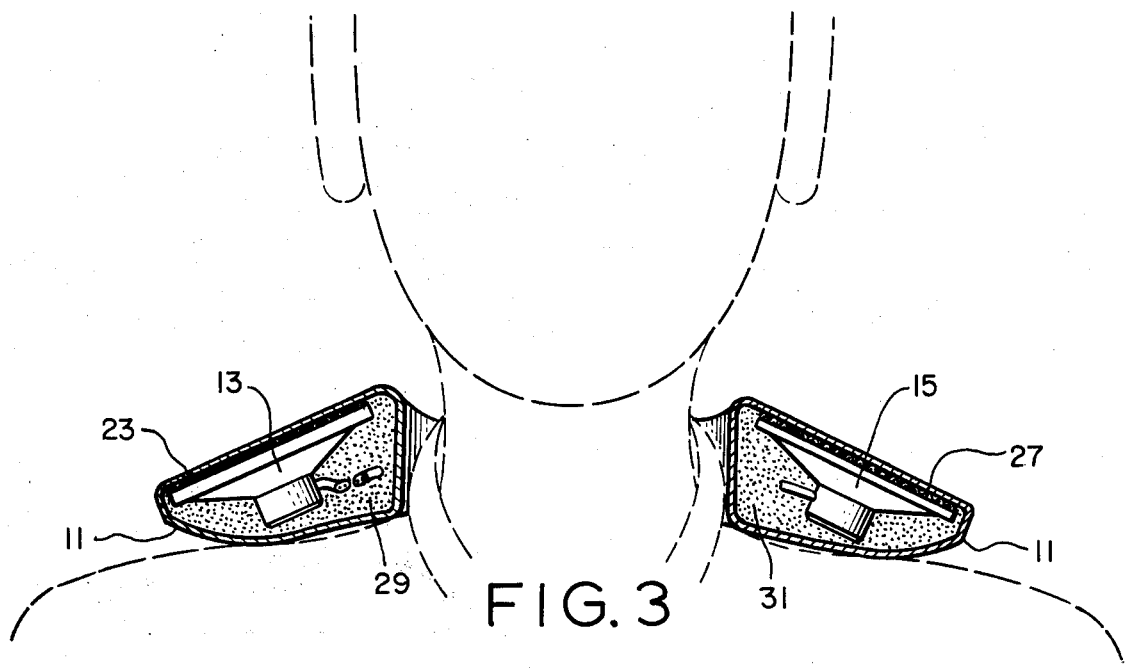
FIG.3

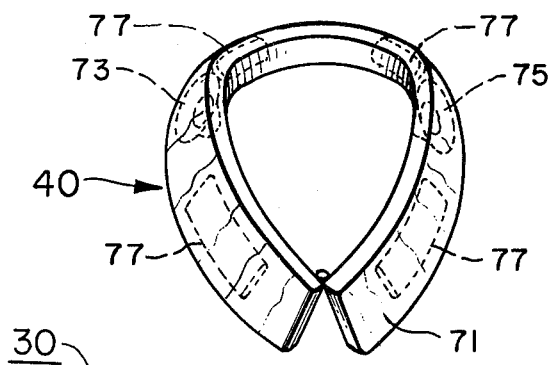
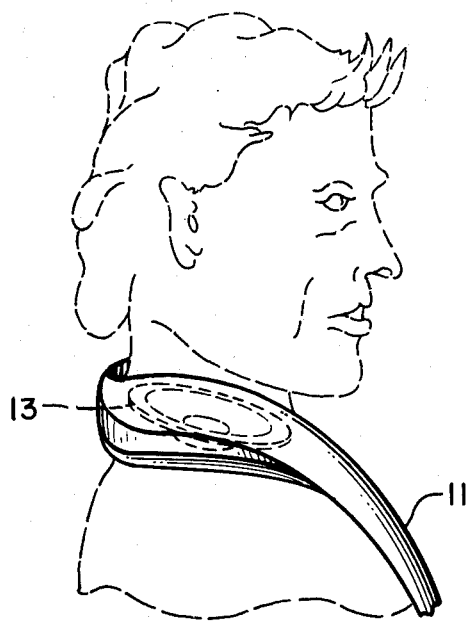
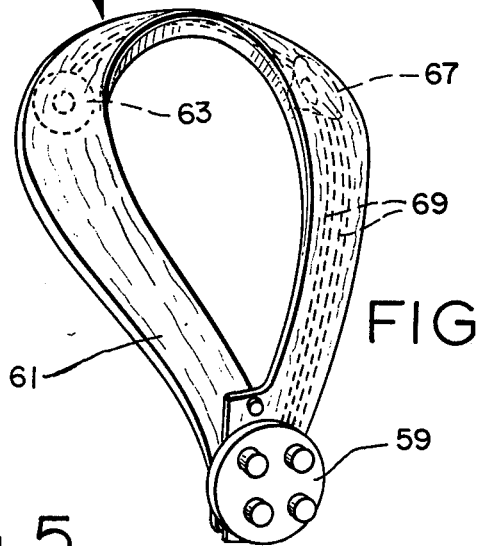
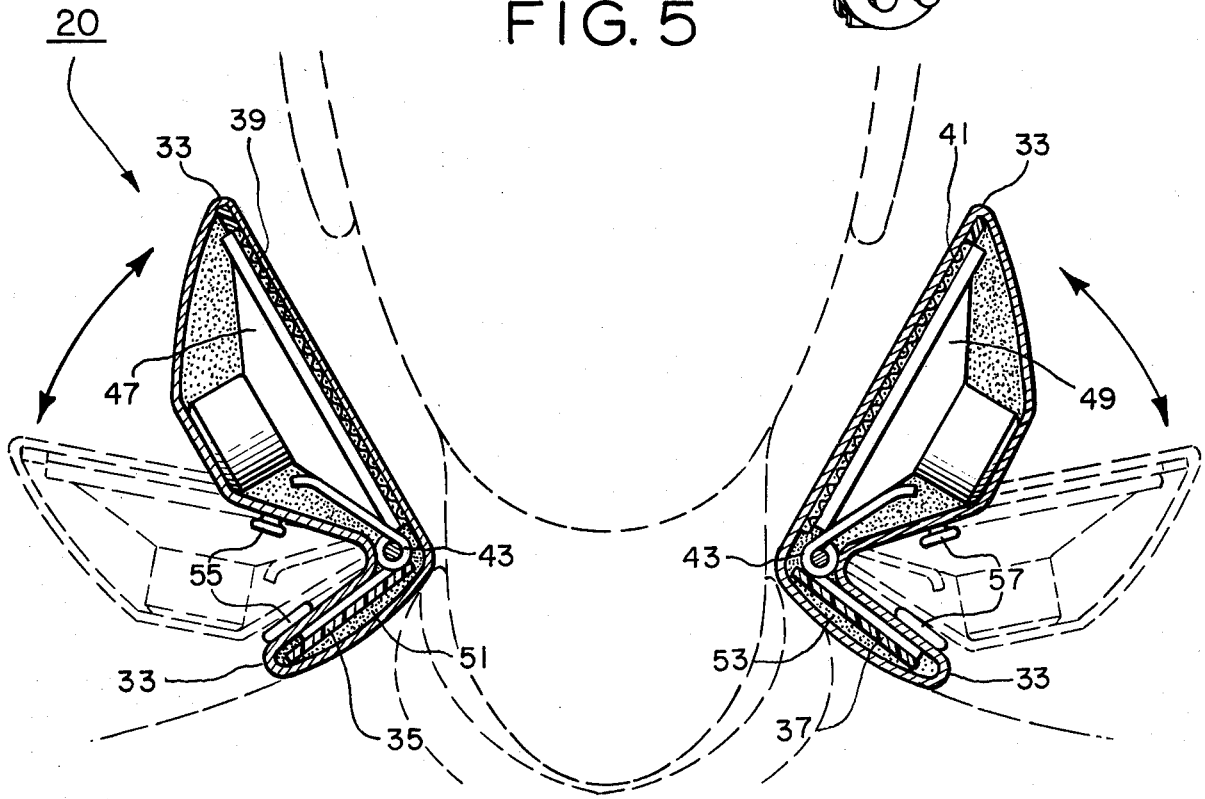

PERSONAL AUDIO LISTENING SYSTEM

BACKGROUND OF THE INVENTION

The subject invention relates to personal audio listening systems which are worn by individual listeners. Specifically, the subject invention is directed to a personal audio listening system to be worn by an individual listener around the neck without interfering with arm movement and without severely diminishing the listener's hearing of ambient sounds.

Some prior art listening systems which allow a listener to carry the source of audio sounds such as music include headphone type apparatus. The major disadvantages of headphone type systems are the discomfort and inconvenience of wearing a device on the head, the restriction of vigorous activity which might dislodge the headphone, and non-realistic audio reproduction wherein the apparent source seems to be in the listener's head. Such non-realistic reproduction becomes very evident in the headphone reproduction of stereo programming. From a safety viewpoint, headphones generally prevent the listener from hearing ambient sounds which may include warning signals and also present a potential source of injury to the listener's head in the event of an accident. Some states have made the use of headphones by the driver of an automobile illegal specifically because of such potential hazards.

Related prior art devices can also be found in the field of portable two-way communication devices wherein the need for sound reproduction in a variety of situations such as police emergencies and rescue operations encouraged the development of portable electronic communication devices. Examples of such two-way communication devices can be found in U.S. Pat. Nos. 3,114,105 and 3,370,236. The disadvantages of such two-way communication devices generally include non-acceptable music reproduction resulting from the use of components which acceptably reproduce sounds only in the normal voice frequency range and the placement of the transducers of such devices which is generally optimized for microphone use. It is therefore evident that such prior art two-way communication devices are generally unacceptable for musical entertainment purposes. Moreover, some of the prior art portable two-way communication devices include complicated straps and harnesses for maintaining the transducers near the wearer's mouth so that the wearer's voice could be readily detected.

A common disadvantage of the above described prior art devices is the high cost of manufacturing such reproduction systems which generally require specially manufactured components such as molded earpieces.

It is therefore an object of the present invention to provide a personal audio listening system which can be worn by an individual listener without having to wear any sort of device attached to the head or ears.

Another object of the invention is to provide a personal audio listening system which allows the listener to clearly hear ambient sounds.

It is a further object of the present invention to provide a personal audio listening system which provides excellent musical reproduction.

Still another object of the present invention is to provide a personal audio listening system worn by an individual listener which reproduces stereo sound with excellent stereo imaging when the listening system is used with a source of stereo programming.

Another object of the present invention is to provide a personal audio listening system which can be worn by the listener while engaging in various vigorous activities which require the unhindered use of the arms and head of the listener.

A further object of the invention is to provide a personal audio listening system wherein the listener is not encumbered with complicated harnesses and straps.

Another object of the invention is to provide a personal audio listening system which is of low cost and can be readily manufactured.

SUMMARY OF THE INVENTION

The foregoing and other objects are accomplished by the subject invention by providing a listening system which is worn by the listener around the neck. The system includes first and second transducers which are responsive to an electrical audio input and are supported in a flexible body which surrounds the back and side portions of the listener's neck and generally rest on the listener's shoulders. Each of the transducers is mounted in the flexible body beneath a corresponding ear and in the proximity of the listener's neck and shoulders. A source of electrical audio signals is coupled to the transducers and may be external to the supporting body. For example, the audio source can be attached to the supporting body or may be carried and supported by some other device. All or some of the electronic components of the audio source coupled to the speakers can also be mounted within the supporting body. The source of audio electrical signals may be a stereo source which is appropriately connected to the speakers.

One embodiment of the invention is directed to a supporting body having provisions for allowing the positioning of the speakers in at least two positions in order to bring the speakers closer to the listener's ears. Stereo imaging is produced by the embodiments of the subject invention because of the distributed sound reproduced by the embodiments of the subject invention which is completely different from the localized sound of conventional headphones. Moreover, the disclosed personal listening system enhances the stereo effect by the advantageous use of sound conduction through the listener's shoulder, neck and head which is achieved by placement of the speakers in the proximity of the listener's neck and shoulders when the disclosed listening system is being worn.

BRIEF DESCRIPTION OF THE DRAWINGS

The various objects, advantages and features of the present invention will become more apparent to one skilled in the art from the following detailed disclosure and claims when read in conjunction with the accompanying drawings in which:

FIG. 1 is a perspective view of one embodiment of the disclosed listening system showing the supporting body and the locations of the speakers.

FIG. 2 shows the system of FIG. 1 being worn by a listener along with a source of audio signals appropriately strapped to the listener.

FIG. 3 is a cross-section view of the listening system showing the relative positioning of the speakers within the supporting body and with respect to the listener's shoulders, neck and ears.

FIG. 4 is a partial side view of the disclosed listening system showing the positioning of a speaker with respect to the corresponding ear.

FIG. 5 is a partial cross-section of the disclosed personal audio listening system showing provisions within the supporting body for allowing the speakers to be selectively positioned in at least two positions.

FIG. 6 shows the disclosed listening system with an external audio source which is attached to the supporting body.

FIG. 7 shows the personal audio listening system of the subject invention indicating where the electronic components for the audio source may be enclosed within the supporting body.

DETAILED DESCRIPTION OF THE DISCLOSURE

FIG. 1 shows the basic elements of a personal audio listening system 10. The system 10 includes a flexible supporting body 11 and speakers 13 and 15 acoustically mounted within the supporting body 11. The details of the speaker mounting end structure within the supporting body 11 will be discussed further below with respect to FIG. 3. The system 10 further includes a flexible connecting wire 17 which may be appropriately coiled for stretching to a desired length. A selectively engageable connector 19 is connected to the free end of the connector wire 17 and can be any of the commercially available connectors having provisions for accepting stereo signals. For example, a standard phonoplug can be used. Enclosed within the supporting body 11 are electrical coupling wires 21 which are appropriately connected between the connecting wire 17 and speakers 13 and 15.

The supporting body 11 can be made from various combinations of materials which accomplish the desirable features of adequate support for the speakers 13 and 15, light weight, durability and strength, ease of cleaning, and sufficient flexibility to conform to the listener's neck and shoulder contours for wearing comfort. For example, the outside of the supporting body 11 may be denim, nylon or vinyl or other material which is wear-resistent and flexible. Enclosed within the outer covering should be some material which gives the supporting body 11 shape and provides wearing comfort for the listener. Examples of such materials include molded flexible plastic, foam padding, fiber padding, and supporting wires.

The supporting body 11 shown in FIG. 1 includes downwardly extending portions which are joined together to rest on the listener's chest and form a closed loop. The downwardly extending portions are joined together by safety releasable fasteners 23 which are shown as snap fasteners. However, a zipper or a cloth fastener such as those marketed under the trademark "Velcro," may also be used. Of course, the supporting body 11 need not have the downwardly extending portions and can form a smaller loop around the listener's neck. Moreover, a closed loop is not necessary and the supporting body 11 may be U-shaped.

FIG. 2 illustrates one way of using the listening system 10 with an external source of audio signals. Specifically, the listening system 10 is worn around the neck of the listener with the speakers 13 and 15 having been mounted within the supporting body 11 in such a manner that each speaker is substantially beneath the corresponding ear of the listener and substantially rests in the proximity of the listener's neck and shoulder. A source of audio signals 111 may be appropriately strapped to the listener's body by strap 113. The audio source 111 accepts the connector 19 and may be, for example, an FM stereo source, a cassette player, or an AM radio.

From the foregoing it is clear that in order to achieve optimum sound reproduction, particularly stereo reproduction, each of the speakers 13 and 15 should be located beneath a corresponding ear and as close to the corresponding ear as is practicable without causing a dangerous condition or a deterioration in the ambience of the reproduced stereo imaging. FIG. 3 illustrates how the speakers 13 and 15 may be positioned within the supporting body 11 in order to achieve the desired reproduction qualities. The speakers 13 and 15 are covered by protective screens 25 and 27, respectively, which may be of metal or plastic or similar rigid material which is reasonably acoustically transparent. Some form of padding 29 and 31 is provided around the speakers 13 and 15, respectively, for providing listener comfort and acoustic padding and for maintaining the positions of the respective speakers 13 and 15. Of course, it would be possible to increase the amount of padding 29, 31 or to use a form maintaining padding material, such as foam or rubber, in order to raise the speakers 13, 15 closer to the ears. The choice of padding material, the amount of material, and the location of the material can also be used to direct the respective speaker cones in the desirable direction of the respective ear. It should be noted that the speaker cones of the respective speakers 13, 15 need not be directed exactly at the respective ears of the listener, but may be directed slightly outwardly and away from the respective ears. Since the distance between the lower portion of the listener's neck and the listener's ears is reasonably short, such outwardly directed positioning will not substantially deteriorate the perceived sound and will still result in excellent sound reproduction. It should be noted that both accurately directing the speakers 13 and 15 toward the respective ears and closer placement of the speakers 13 and 15 to the respective ears brings about a reduction in the power required to drive the speakers 13 and 15. Therefore, it would be advantageous to optimize speaker placement.

FIG. 4 shows a partial side view of the listening system 10 of FIG. 1 and indicates in outline the relative position of the speaker 13 with respect to the corresponding listener's ear.

FIG. 5 illustrates a particular mounting structure for allowing the listener to selectively position the speakers in the supporting body of the personal listening system 20.

Specifically, the listening system 20 of FIG. 5 includes a flexible supporting body 33 similar to the supporting body 11 shown in FIG. 1. Enclosed within the supporting body are base plates 35 and 37 which are suitably hinged with movable speaker plates 39 and 41. Springs 43 and 45 are used to bias the movable plates 39, 41 away from the base plates 35, 37, respectively. The springs 43 and 45 may be coil or leaf springs, and, of course, could be made from any sufficiently resilient material. Speakers 47 and 49 are mounted on the movable plates 39 and 41 which can be wire or plastic screens or can also be rigid plates with openings for the speakers 47 and 49. Such openings should be covered with protective screens. Padding 51 and 53 is provided underneath the base plates 35 and 37, respectively, and should also be in other portions of the supporting body 33 for listener comfort and safety. On the outside of the supporting body, fasteners 55 and 57 are provided for allowing the structures including the movable plates 39, 41 and corresponding speakers 47, 49 to be positioned in a lowered position adjacent the respective base plates 35, 37 when desired. (As shown by the dotted lines in FIG. 5.) The fasteners 55 and 57 may be snap fasteners or flexible fasteners such as those sold under the trademark "Velcro." A short zipper, although not shown, could also be used to allow the selective positioning of the speakers 47 and 49.

The advantages provided by the listening system 20 of FIG. 5 include improved control of the acoustic radiation, lower power requirements because of the closer placement of the speakers 47 and 49 to the respective ears of the listener, and the choice of placing the speakers 47 and 49 in a lowered position in situations where the raised position might be a hinderance, dangerous or inconvenient.

FIG. 6 shows a listening system 30 similar to the system 10 shown in FIG. 1 with the additional feature of having an audio source 59 attached to the terminal portions of the downwardly extending portions of the supporting body 61. The audio source may be of any readily available compact commercial audio sources such as an FM stereo radio or a cassette tape player. The positions for speakers 63 and 67 are shown in outline form along with electrical coupling wires 69. Of course, the selectively positionable speaker feature shown in FIG. 5 can also be incorporated into the system 30 of FIG. 6. An auxiliary strap (not shown) might be used to stabilize the audio source 59 on the listener's chest. Although FIG. 6 shows a particular placement of the audio source 59 on the downwardly extending portions of the supporting body 61, it would be obvious to one skilled in the art that other locations for the attachment of the audio source 59 would be possible. As previously discussed, the downwardly extending portions of the supporting body 61 may not be required in a structure where the supporting body is a smaller loop which more closely surrounds the listener's neck.

FIG. 7 shows a personal listening system 40 wherein all or some of the electronic components of an audio signal source can be supported within a supporting body 71. Two speakers 73 and 75 are supported within the supporting body 71 in a manner similar to the speakers shown in FIG. 1. Of course, the positionable speaker structure shown in FIG. 5 can be incorporated into the system 40 shown in FIG. 7.

The supporting body 71 should include a protective outer covering, an internal support structure such as flexible plastic or wire, and padding, as discussed above with respect to the listening system 10 shown in FIG. 1. The elements 77 are identically numbered outlines representative of the locations within the supporting body where electronic components for an audio source may be located. It is evident that the components for an audio source may be distributed such that some of the components may be within the supporting body 71, while the remaining components may be external to the supporting body. The external components may then be coupled to the supporting body 71 and the internal components 77 in a manner similar to the systems shown in FIGS. 2 and 6. For example, the mechanical driving portions of an audio tape system can be external to the supporting body 71 and the electronic portions such as amplifiers can be mounted within the supporting body 71. Structures not shown and utilizing the placement of components for an audio source within the supporting body 71 will be obvious to one skilled in the art from the foregoing disclosure.

Although the foregoing has been a description and illustration of specific embodiments of the invention, various modifications and changes thereto can be made by persons skilled in the art within the scope and spirit of the invention as defined by the following claims.

What is claimed is:

1. A personal audio listening system to be worn by an individual listener, comprising:
    a first and a second small audio speaker for generating audible sound in response to an electrical signal input;
    means for coupling said first and second audio speakers to a source of the electrical signal input;
    means for supporting and enclosing each of said first and second audio speakers beneath a corresponding ear of the listener and in the proximity of the listener's neck and shoulders, said supporting means comprising a flexible body for surrounding at least the back and sides of the listener's neck and further being adapted to conform to the neck and shoulder body contours of the listener and to support said audio speakers in such a manner that audible sounds are transmitted by said first and second audio speakers to a corresponding ear of the listener by acoustic radiation as well as by conduction through the listener's body.

2. The personal audio listening system of claim 1 wherein said coupling means comprises an electrical coupling connected to said first and second audio speakers and a selectively engageable connector for accepting the electrical signal input.

3. The personal audio listening system of claim 2 wherein said electrical coupling and said connector are adapted to accept a stereo signal input for providing said first and second audio speaker with the proper stereo channel signals.

4. The personal audio listening system of claim 1 wherein each of said audio speakers is mounted to be selectively positionable in one of at least two predetermined positions within said supporting means.

5. A personal stereo listening system to be worn by an individual listener, comprising:
    first and second transducer means for generating audible stereo sound in response to electrical stereo input signals;
    means for generating electrical stereo signals for application to said first and second transducers;
    means for electrically coupling said audio signal source to said first and second transducer means; and
    means for supporting and enclosing said first and second transducer means beneath a corresponding ear of the listener, said supporting means being adapted to conform to the neck and shoulder body contours and to support said first and second transducer means in such a manner that audible sounds are transmitted to the corresponding ear of the listener by acoustic radiation as well as by conduction through the listener's body so as to create a stereo effect when used by the listener.

6. The personal stereo listening system of claim 5 wherein each of said first and second transducers comprises a small audio speaker acoustically mounted within said supporting means in the proximity of the listener's neck and shoulder and beneath the corresponding ear of the listener.

7. The personal audio listening system of claim 6 wherein said supporting means comprises a flexible body for surrounding at least the back and sides of the listener's neck while resting on the listener's shoulders.

8. The personal stereo listening system of claim 7 wherein said stereo signal generating means comprises a stereo audio source which is external to said supporting means.

9. The personal audio listening system of claim 8 wherein said source of electrical stereo signals comprises a radio receiver attached to the outside of said flexible body.

10. The personal stereo listening system of claim 8 wherein said coupling means includes an electrical coupling between said stereo audio source and said first and second audio speakers and a selectively engageable connector.

11. The personal audio listening system of claim 7 wherein each of said audio speakers is mounted to be selectively positionable in one of at least two predetermined positions within said supporting means.

12. The personal audio listening system of claim 7 wherein said radio receiver includes electronic components being supported and enclosed within said flexible body.

* * * * *